United States Patent
Ball et al.

(10) Patent No.: US 6,381,990 B1
(45) Date of Patent: May 7, 2002

(54) DRAW FURNACE SEALING ASSEMBLY AND METHOD

(75) Inventors: Steven Craig Ball; John Morris Barnard, Sr., both of Wilmington; James Alan Snipes, Concord, all of NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/400,155

(22) Filed: Sep. 21, 1999

Related U.S. Application Data

(60) Provisional application No. 60/121,801, filed on Feb. 26, 1999.

(51) Int. Cl.[7] .............................................. C03B 37/029
(52) U.S. Cl. ............................ 65/483; 65/530; 65/540
(58) Field of Search ........................ 65/483, 495, 502, 65/530, 540

(56) References Cited

U.S. PATENT DOCUMENTS

| | | | |
|---|---|---|---|
| 4,157,906 A | 6/1979 | Bailey | 65/3 |
| 4,547,644 A | 10/1985 | Bair et al. | 219/10.49 |
| 5,059,229 A | * 10/1991 | Blankenship | 65/424 |
| 5,284,499 A | 2/1994 | Harvey et al. | 65/3.11 |
| 5,410,567 A | 4/1995 | Brundage et al. | 373/137 |
| 5,637,130 A | 6/1997 | Nagayama et al. | 65/435 |

FOREIGN PATENT DOCUMENTS

| | | |
|---|---|---|
| EP | 0 803 478 A | 10/1997 |
| GB | 1 280 463 A | 7/1972 |
| JP | 60-155541 A | 12/1985 |
| JP | 63-285133 A | 3/1989 |
| WO | 98 18735 A | 5/1998 |

OTHER PUBLICATIONS

European Patent Office Abstract of Japanese Application, Publication No. 60081039, dated Sep. 5, 1985.
European Patent Office Abstract of Japanese Application, Publication No. 03126635, dated May 29, 1991.
European Patent Office Abstract of Japanese Application, Publication No. 09002831, dated Jul. 1, 1997.
European Patent Office Abstract of Japanese Application, Publication No. 61191535, dated Aug. 26, 1986.
European Patent Office Abstract of Japanese Application, Publication No. 63176330, dated Jul. 20, 1988.
European Patent Office Abstract of Japanese Application, Publication No. 60155541, dated Aug. 15, 1985.
European Patent Office Abstract of Japanese Application, Publication No. 63285133, dated Nov. 22, 1988.

* cited by examiner

Primary Examiner—John Hoffman
(74) Attorney, Agent, or Firm—Timothy R. Krogh

(57) ABSTRACT

An apparatus and method for sealing the top of an optical waveguide draw furnace is disclosed. The apparatus includes an assembly constructed and arranged to removably cover the top of the draw furnace while mating with the downfeed handle. The apparatus includes an elongated sleeve having a base and a sealing mechanism positioned on the sleeve at a location remote from the base. The sleeve defines a chamber for receiving the downfeed handle, and the sealing mechanism is arranged with respect to the sleeve to mate with the downfeed handle received in the chamber. In one aspect of the invention, the apparatus further includes an inert gas purge for providing an inert atmosphere within the chamber. A method of sealing the top of an optical waveguide draw furnace is also disclosed.

16 Claims, 5 Drawing Sheets

DRAW FURNACE SEALING ASSEMBLY AND METHOD

This Appln claims benefit of Prov. No. 60/121,801 filed Feb. 26, 1999.

BACKGROUND OF THE INVENTION

1. Field of the Invention

The present invention relates generally to a method and assembly for sealing a draw furnace, and more particularly, to a sealing assembly and method for sealing the top of an optical waveguide draw furnace.

2. Technical Background

Relatively high temperature heat sources are required for drawing high strength, low loss optical waveguide fibers from high silica-content optical waveguide fiber preforms or blanks. Two of the predominant heat sources utilized for drawing such fibers are zirconia furnaces and graphite furnaces. Fiber draw furnaces generally operate at temperatures greater than about 1900° C., typically as high as about 2050° C.

A disadvantage associated with zirconia induction furnaces is that extended use and thermomechanical stresses due to poor thermal shock resistance cause cracks in the muffle and susceptor. This cracking causes zirconia particles to migrate from the inner surface of the furnace onto the preform and/or fiber being drawn from the preform resulting in substantially weakened fiber and unacceptable product losses. Moreover, zirconia induction furnaces are sensitive to rapid changes in temperature. Accordingly, significant amounts of time are necessary for increasing and decreasing the temperatures within the furnace. Rapid heating and cooling of the furnace results in fracturing of the zirconia muffle, which necessitates replacement of the muffle and results in significant furnace down time.

Such shortcomings lead to the development of graphite induction furnaces. Graphite induction furnaces typically include a graphite muffle which is insensitive to rapid changes in temperature and thus is less susceptible to cracking. It has been found, however, that graphite furnaces are susceptible to oxidation at temperatures approaching about 450° C. and that oxidation is particularly problematic when the graphite is exposed to the high temperatures used to draw optical waveguide fibers. For this reason, among others, it is preferable to maintain an inert atmosphere within the draw furnace. Oxidation occurs when gasses from ambient atmosphere react with the solid carbon muffle at high temperatures according to the following reactions:

$$C + O_2 \rightarrow CO_2; \text{ and} \quad (1)$$

$$C + CO_2 \rightarrow 2CO. \quad (2)$$

A typical onset temperature for reaction (1) for a graphite grade used in a draw furnace is about 700° C. Reaction (2) becomes significant above 900° C. These reactions of the furnace muffle with oxygen and carbon dioxide cause the furnace muffle to be consumed, especially at elevated fiber drawing temperatures, and are referred to generally as CO events.

The graphite muffle material is a composite of graphite grains bonded together by a carbon binder matrix. It is believed that the binder material is more susceptible to oxidation than the graphite grains. Therefore, when the composite of the two materials is exposed to air, and thus oxygen at temperatures above the oxidation onset temperatures, the matrix binder material preferentially oxidizes. The graphite grains, having no binder left to hold them in place, are then free to fall away from the composite structure. It is believed that this mechanism causes graphite particulate to migrate from the muffle wall to the fiber preform and/or fiber during drawing.

Graphite particulate that becomes incorporated into the fiber during drawing causes unacceptable product losses due to point defects. Point defects manifest themselves as sharp attenuation increases in the signal transmitted through the fiber. Point defect product losses due to graphite particulate from draw furnaces can be greater than about 5%, which is an unacceptably high loss. Graphite particulate that has adhered to the fiber during the draw process also contributes to fiber breaks.

In order to reduce graphite particulation produced by oxidation of the graphite muffle material, and thus the number of resulting point defects, an inert gas is typically supplied to the interior of the furnace to prevent ambient air and other gases from entering the furnace. Unfortunately, there are a number of operations that occur during optical waveguide draw operations which present ambient air and other gases with the opportunity to enter the furnace despite delivery of high inert gas flow rates into the furnace. When a mistake is made during these draw operations, either by human error, by mechanical failure, or otherwise, ambient air and/or other gases are often permitted to enter the furnace and a CO event occurs.

Many of these CO events occur during movement or operation of the top hat assemblies presently used to close the opening in the top of a draw furnace during blank load, unload, and idle periods. Typical top hat assemblies include a viton/rulon seal that is positioned adjacent the top of the optical waveguide draw furnace when the top hat assembly is positioned over the downfeed handle and lowered onto the draw furnace. In addition, these top hat assemblies incorporate a plurality of hooks used in manually lowering and raising the top hat assembly. The hooks are specifically employed to raise the top hat assembly while the downfeed handle is being removed from the draw furnace. Currently, an operator must engage the hooks prior to removal of the downfeed handle from the draw furnace to ensure that the top hat assembly is being withdrawn from the top of the draw furnace as the downfeed handle and the remainder of the waveguide blank are removed from the hot zone of the draw furnace. Otherwise, that portion of the downfeed handle exiting the hot zone of the draw furnace will approach the top hat assembly, and the extreme heat retained by the downfeed handle will melt the viton/rulon or other sealing member of the top hat assembly. Often times, however, an operator fails to engage the hooks, which ultimately results in the melting and thus the premature replacement of the top hat sealing member.

Moreover, if an operator fails to disengage the hooks after the top hat assembly has been positioned on the top of the draw furnace, certain aspects of the fiber drawing operation itself can create CO events. Generally, once a seal is formed between the top hat and the top of the draw furnace, the bottom door assembly of the draw furnace is opened and fiber drawing commences. During the start of optical waveguide fiber draw, the optical fiber blank is typically partially raised back out of the hot zone of the draw furnace to stretch and thin the fiber in order to obtain a desired fiber diameter. If the hooks are still engaged with the top hat assembly during this time, the top hat raises off of the top of the draw furnace and the seal is broken. Since the bottom door assembly of the draw furnace is open during fiber draw, the broken top hat seal creates what is known in the art as a chimney effect. The chimney effect is the rapid intake of air through the bottom opening in the draw furnace caused by, inter alia, the opening of the top of the draw furnace. Ambient air is thus forced into the muffle of the draw furnace and the oxygen contained within the air reacts with the carbon muffle causing a CO event. The graphite particulate is then free to migrate to the fiber which results in fiber being formed with an unacceptable number of point defects. In addition, the entrance of air into the draw furnace during fiber draw also results in diameter upsets which also creates unusable fiber. Moreover, each CO event degrades the draw furnace muffle which in turn reduces draw furnace efficiency and necessitates muffle replacement.

In view of these and other shortcomings, an improved assembly and method of sealing an optical waveguide draw furnace is needed to prevent the entrance of ambient air and other unwanted gases into the draw furnace.

SUMMARY OF THE INVENTION

One aspect of the present invention relates to an apparatus for cooperating with a downfeed handle to seal the top of an optical waveguide draw furnace. The apparatus includes an assembly that is constructed and arranged to removably cover the top of the draw furnace and mate with the downfeed handle. The assembly includes an elongated sleeve having a base and defining a chamber for receiving the downfeed handle. The apparatus further includes an inert gas supply which communicates with the assembly to selectively deliver inert gas into the chamber.

In another aspect, the invention relates to an apparatus for cooperating with a downfeed handle to seal the top of an optical waveguide draw furnace. The apparatus includes an elongated sleeve having a top and a base, and defining a chamber for receiving the downfeed handle. The apparatus further includes a sealing mechanism positioned on the sleeve at a location remote from the base. The sealing mechanism is arranged with respect to the sleeve to mate with the downfeed handle received in the chamber.

In yet another aspect the present invention is directed to a method of sealing the top of an optical waveguide draw furnace. The method includes the steps of sliding an assembly onto a downfeed handle such that the assembly is supported on the downfeed handle. The assembly defines a chamber for receiving the downfeed handle, and has a base and a sealing mechanism remote from the base. The sealing mechanism cooperates with the downfeed handle to close one end of the chamber. The chamber is purged with an inert gas, and the downfeed handle is lowered into the optical waveguide draw furnace to position the assembly on the top of the draw furnace.

The top hat assembly of the present invention results in a number of advantages over other top hat assemblies presently available. Principally, the top hat assembly of the present invention significantly reduces the number of CO events resulting from air entering the top of the draw furnace, and/or air entering through the bottom of the draw furnace due to unintentional removal of the top hat assembly when the bottom door assembly is in an open position, particularly during fiber draw. The reduction of CO events significantly reduces the number and frequency of point defect losses in optical waveguide fibers drawn in furnaces, particularly those having graphite muffles, and further, prolongs the life of the graphite muffles employed in draw furnaces. In addition, because the top hat assembly of the present invention obviates the use of hooks, operator error is substantially eliminated during fiber draw operations. Moreover, the construction and arrangement of the sealing mechanism of the present invention significantly extends the seal life, which in turn reduces draw tower down time associated with the replacement of spent seals.

Additional advantages are provided by the sealing assembly and method of the present invention. The inert gas purge cooperating with the top hat assembly of the present invention displaces air trapped within the top hat assembly, which in turn prevents air from entering the top of the draw furnace during optical waveguide blank loading. Without the purge, air otherwise trapped in the top hat assembly would be drawn into the draw furnace when the bottom door assembly is opened to begin fiber draw. That air, once inside the furnace, causes diameter upsets and CO events. Thus, this embodiment of the present invention further reduces the number of diameter upsets and CO events during drawing operations.

A single CO event in a graphite draw furnace during fiber draw typically results in a relatively large percentage of the optical fiber having unacceptable levels of point defects. Accordingly, cleaning of the draw furnace is essential following a CO event. Generally, such cleaning operations result in the draw furnace being down for approximately 6 hours to facilitate such cleaning and servicing operations. A further advantage of the present invention is the reduction in the amount of draw tower down time due to the substantial reduction in the frequency of CO events. Less down time results in increased production of optical fiber, and particularly optical fiber having an insignificant number of point defects.

The top hat assembly and method of sealing the top on an optical waveguide draw furnace of the present invention significantly reduces both mechanical and human error during draw operations. Moreover, the assembly and method of the present invention eliminates the use of hooks with the top hat assembly, and thus minimizes operator interaction with the top hat assembly during drawing operations. Such an assembly and method will reduce the frequency with which sealing members in the assembly are currently replaced, reduce the number of diameter upsets, and will significantly reduce the number of CO events during drawing operations, particularly those resulting from the chimney effect.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
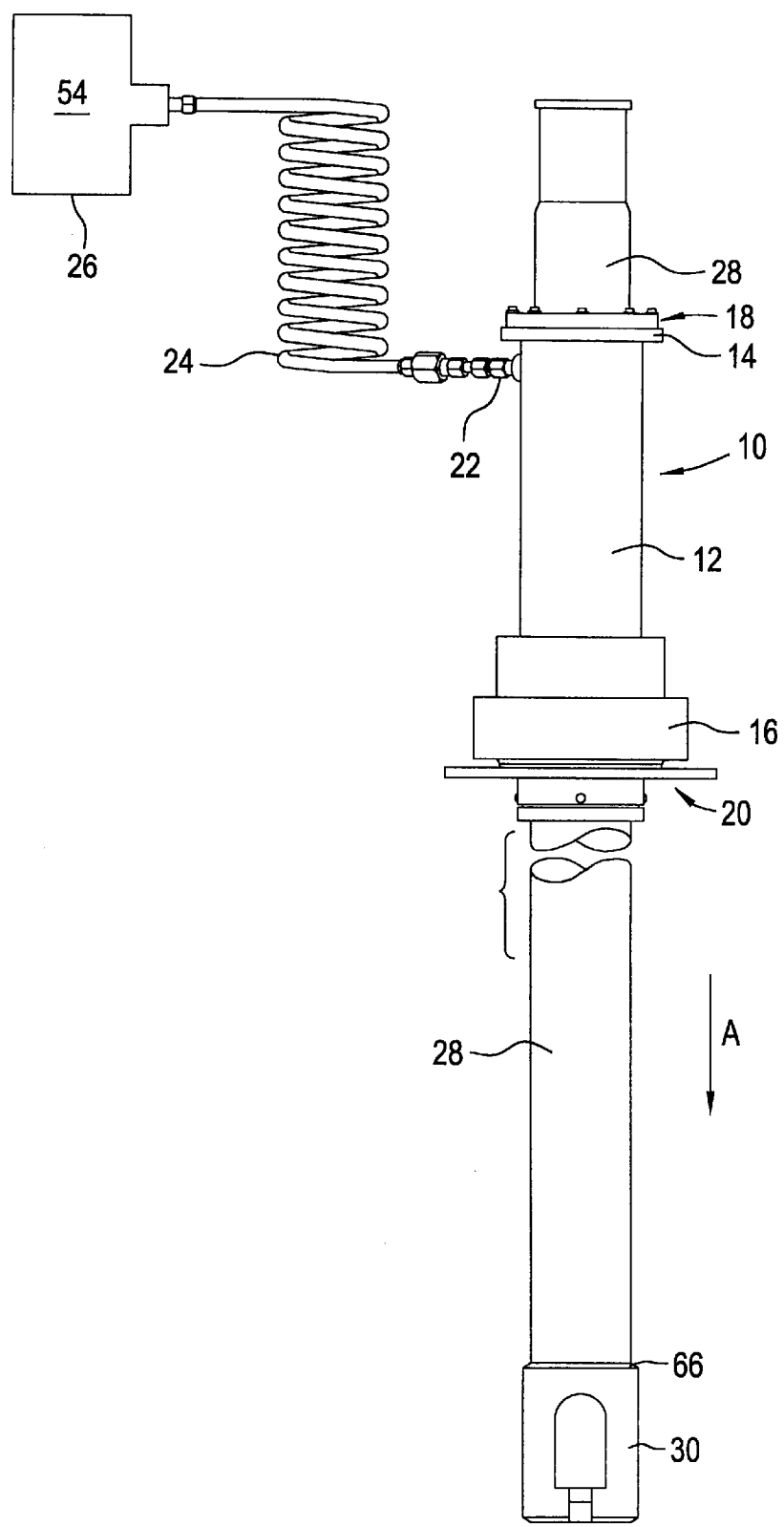
FIG. 1 is a side elevation view of a preferred embodiment of the top hat assembly shown positioned on a downfeed handle in accordance with the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of a top hat assembly of the of the present invention is shown in FIG. 1, and is designated generally throughout by reference numeral 10.

In accordance with the invention, the present invention for sealing the top of an optical waveguide draw furnace includes an assembly that is constructed and arranged to removably cover the top of a draw furnace while mating with a downfeed handle received in the draw furnace. A downfeed handle is an elongated tubular member, which supports the preform or blank, and facilitates the insertion of the blank into and the removal of the blank from the draw furnace. The downfeed handle also facilitates the movement and positioning of the blank within the draw furnace. Preferably, an inert gas supply communicates with the assembly to selectively deliver an inert gas to the assembly, thereby displacing any air residing within the assembly.

As embodied herein, and depicted in FIG. 1, a preferred embodiment of the top hat assembly 10 includes a generally cylindrical sleeve 12 having an upper sleeve flange 14 and a base 16. Top hat assembly 10 is preferably constructed from aluminum, but it could easily be fabricated using some other material, such as, but not limited to, steel. Shown attached to upper sleeve flange 14 is a sealing mechanism 18, which will be described, in greater detail below with reference to the FIG. 2. Shown attached to base 16 is a bumper assembly 20 which will also be described in greater detail below with reference to FIG. 2. Although described herein as being attached to sleeve 12, it will be understood by those skilled in the art that sealing mechanism 18 and bumper assembly 20 can be formed as part of sleeve 12 so as to form a unitary top hat assembly 10.

A purge adapter 22 preferably depends from the sidewall of sleeve 12 beneath upper sleeve flange 14. Purge adapter 22 is sized and shaped to mate with a hose coil 24 extending from an inert gas supply reservoir 26. Top hat assembly 10 is shown positioned on the top portion of a downfeed handle 28. The lower portion of downfeed handle 28 includes a blank support portion 30, which is used to engage the ball of an optical waveguide fiber blank (not shown) so that the blank is suspended beneath downfeed handle 28.

Figure 2:
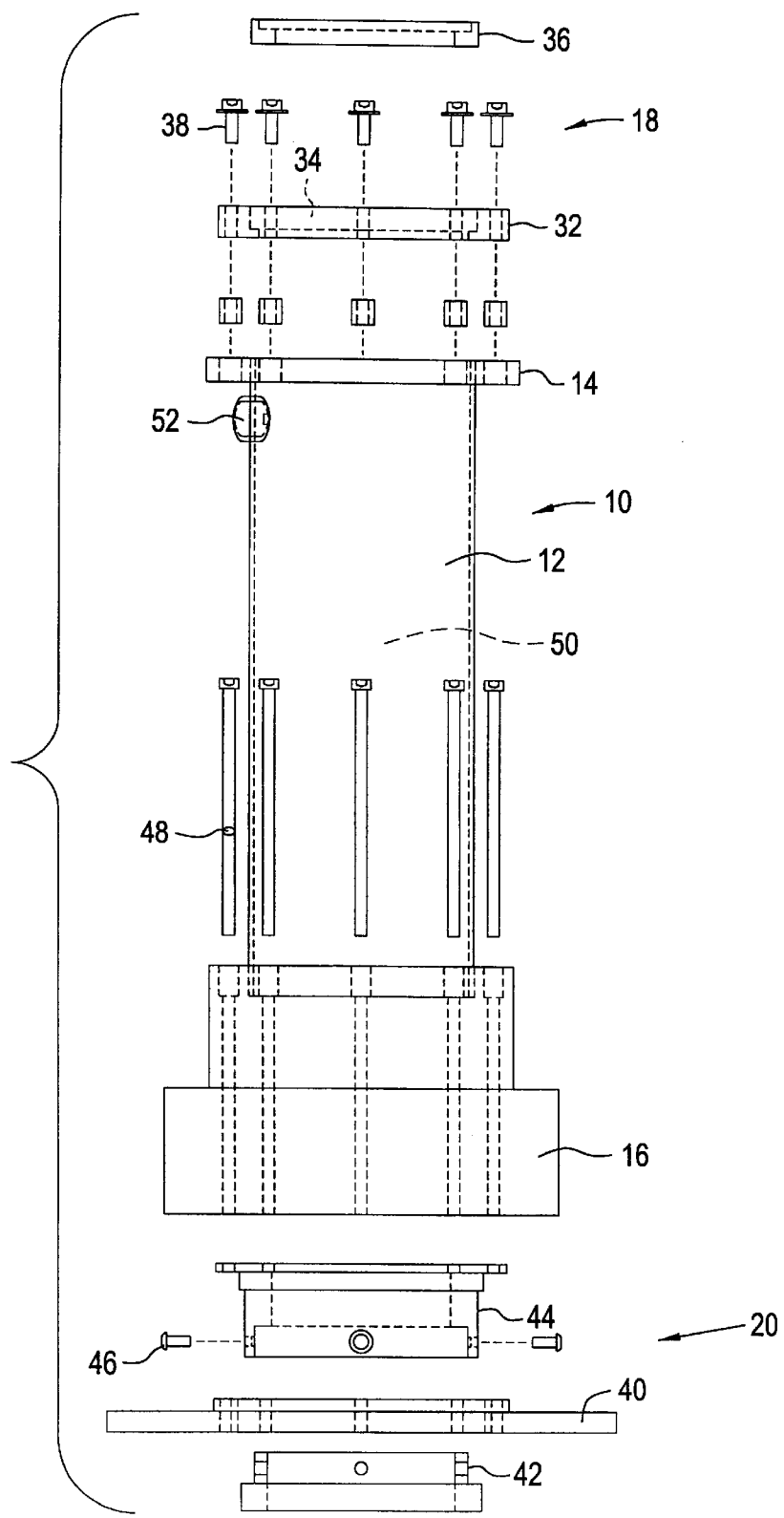
FIG. 2 is an exploded view of the top hat assembly of FIG. 1 shown in elevation.

As shown more clearly in the exploded elevational view of FIG. 2, sealing mechanism 18 preferably includes a retaining ring 32 having a recess 34 for supporting an oil lip seal structure 36. Oil lip seal structure 36 is preferably sized to tightly fit within recess 34 of retaining ring 32. More preferably, oil lip seal structure 36 is press fitted within recess 34, as with an arbor press, so that oil lip seal structure 36 is fixedly secured within retaining ring 32. Sealing mechanism 18 is attached to upper sleeve flange 14 with any of a number of fasteners, such as screws 38, and can easily be removed and disassembled for cleaning and seal replacement.

Bumper assembly 20 includes a bottom plate 40 interposed between a bumper 42 and bumper assembly retaining ring 44. Bottom plate 40 is slidably received onto bumper assembly retaining ring 44 and bumper 42 is attached to bumper assembly retaining ring 44 with fasteners such as retaining screws 46. Bumper assembly 20 is mounted to base 16 of top hat assembly 10 with fasteners such as elongated screws 48 which are circumferentially spaced from each other and passed through base 16 and bottom plate 40. In this way, bottom plate 40, and thus bumper assembly 20, is secured to base 16 of top hat assembly 10.

Thus constructed, top hat assembly 10 defines a tubular chamber 50, which is open at its ends to receive a standard optical waveguide downfeed handle 28, as shown in FIG. 1. Chamber 50 is sized to freely receive downfeed handle 28 such that an annular channel is formed between the inner surface of sleeve 12 and the downfeed handle 28. A purge port 52 passes through sleeve 12 to place chamber 50, and specifically, the annular channel formed around downfeed handle 28, in fluid communication with inert gas 54 housed within inert gas supply reservoir 26.

Figure 3:
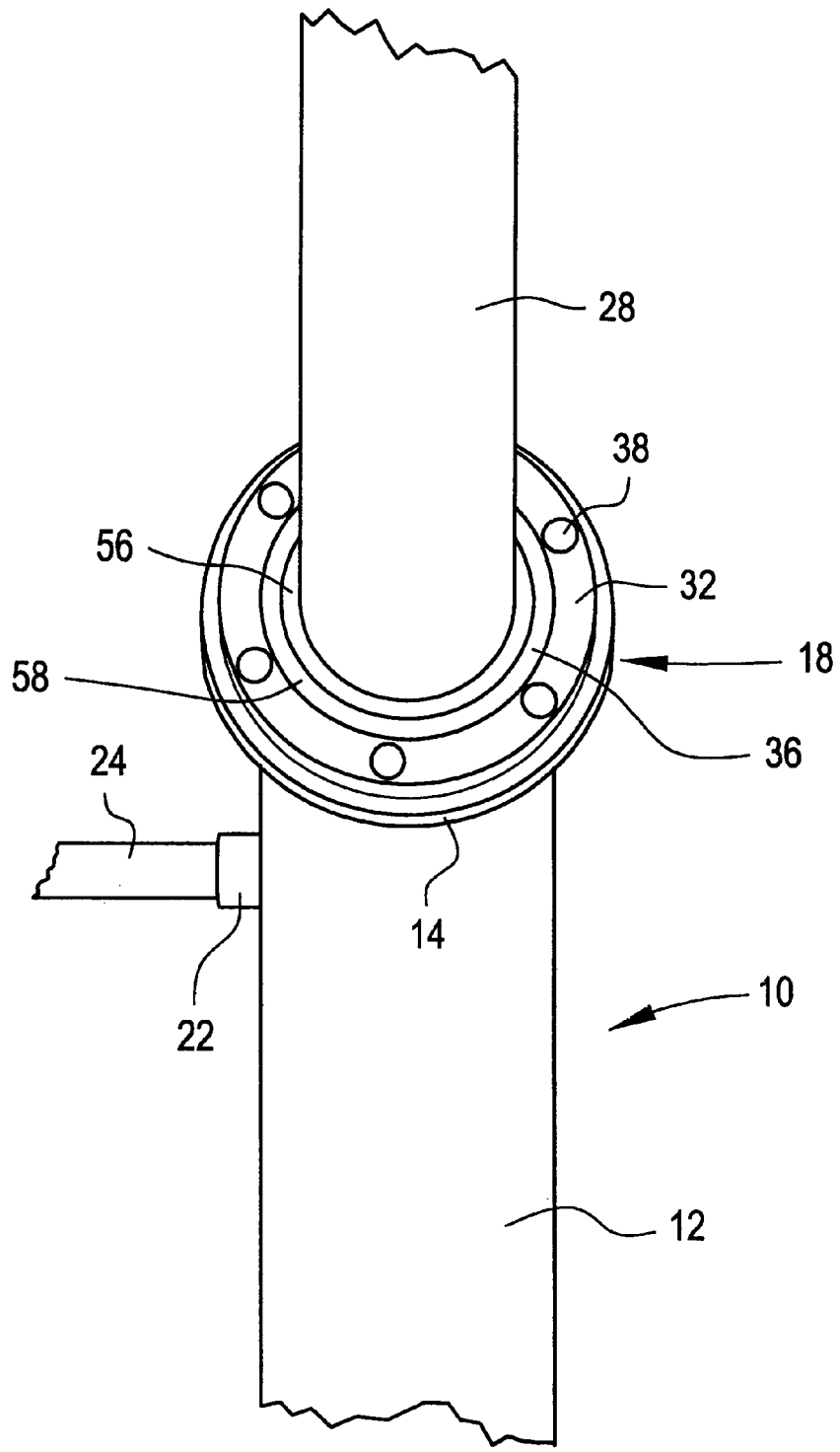
FIG. 3 is a partial perspective view of the top hat assembly of FIG. 1 showing the sealing mechanism mating with a downfeed handle in accordance with the present invention.

The details of the oil lip seal structure 36 are more clearly shown in FIG. 3. Oil lip seal structure 36 supports an annular gasket 56, which is sized to conform to the exterior circumference of downfeed handle 28 when downfeed handle 28 is received within chamber 50 of top hat assembly 10. An annular spring 58 is interposed between gasket 56 and oil lip seal structure 36 to bias gasket 56 against the downfeed handle 28. Accordingly, as downfeed handle 28 shifts within chamber 50, continuous contact between gasket 56 and downfeed handle 28 is maintained.

The operation and method of sealing the top of an optical waveguide draw furnace is more clearly understood with reference to FIGS. 1 through 4. As indicted in FIG. 1, downfeed handle 28 is received in chamber 50 (FIG. 2) of top hat assembly 10 such that gasket 56 (FIG. 3) conforms to the circumference of downfeed handle 28. As depicted in FIG. 3, continuous pressure applied by spring 58 to gasket 56 forms a seal between gasket 56 and downfeed handle 28. Inert gas 54, preferably argon, is delivered from inert gas supply reservoir 26, through hose coil 24 and purge adapter 22, and into chamber 50 through purge port 52 (FIG. 2) to displace the air within chamber 50 with inert gas 54. Because chamber 50 is closed at the top of top hat assembly 10 by the seal created between downfeed handle 28 and gasket 56, air and inert gas 54 are discharged from chamber 50 through the annular gap between bumper 42 (FIG. 2) and downfeed handle 28. Thus, only inert gas resides within top hat assembly 10 as top hat assembly 10 is lowered toward the draw furnace.

Figure 4:
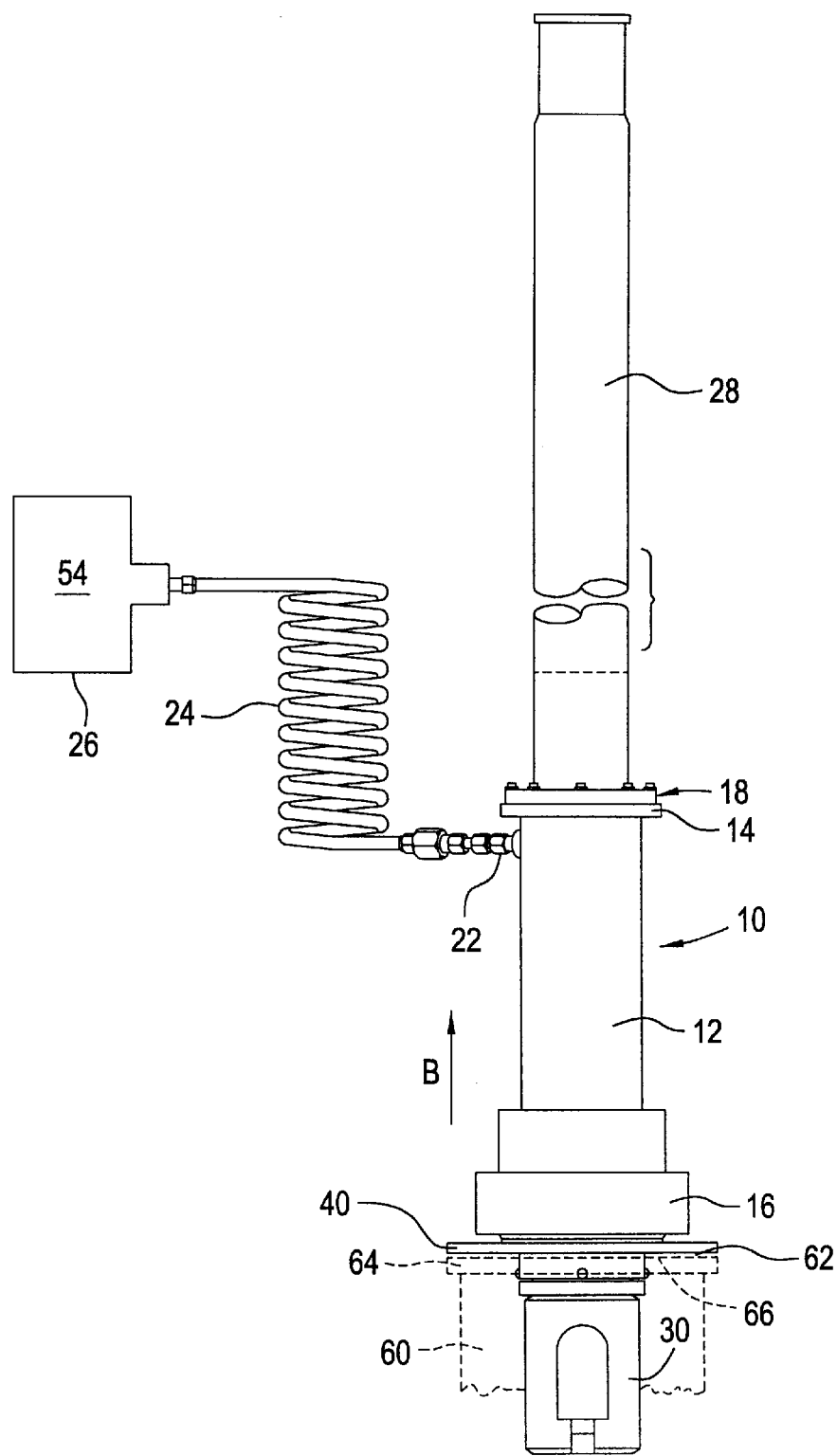
FIG. 4 is a side elevation view of the top hat assembly of FIG. 1 shown adjacent the top of an optical waveguide draw furnace and resting on the blank support portion of a downfeed handle in accordance with the present invention.
Figure 5:
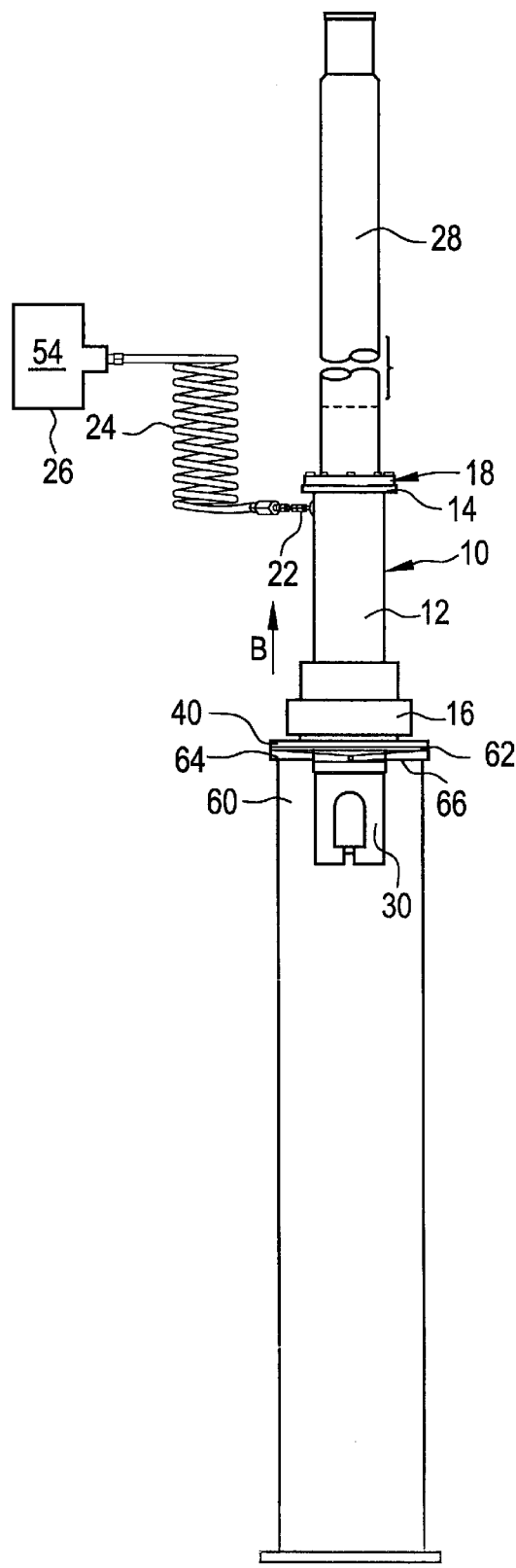
FIG. 5 is a side elevation view of the top hat assembly of FIG. 1 shown adjacent an optical waveguide draw furnace and resting on the blank support portion of a downfeed handle in accordance with the present invention.

During fiber blank loading, top hat assembly 10 is lowered as indicated by reference arrow A (FIG. 1) until bumper 42 rests on a lip 66 of blank support portion 30 of downfeed handle 28. As a result, and as shown in FIGS. 4 and 5, top hat assembly 10 rides on blank support portion 30 of downfeed handle 28 as downfeed handle 28 is lowered into the draw furnace prior to fiber draw. The waveguide blank (not shown) depending downwardly from blank support portion 30 of downfeed handle 28 is lowered into an optical waveguide draw furnace 60 until the blank reaches the hot zone (not shown) of draw furnace 60. As downfeed handle 28 is received within draw furnace 60, bottom surface 62 of bottom plate 40 contacts the upper surface of a gland seal 64 positioned on the top of draw furnace 60. The downward progress of top hat assembly 10 is thus stopped while downfeed handle 28, and thus blank support portion 30, continue moving downward into draw furnace 60. When the blank (not shown) is properly positioned within the hot zone (not shown) of draw furnace 60, the bottom door assembly (not shown) of draw furnace 60 can be opened to begin the fiber draw.

Because inert gas 54 is delivered into chamber 50, only inert gas is available at the top of draw furnace 60 to be pulled into the muffle region of draw furnace 60. Accordingly, oxygen is not present to react with the graphite muffle (not shown) to create a CO event. Preferably, an inert gas such as helium is delivered between gland seal 64 and bottom plate 40 through upper surface 66 of gland seal 64. The inert gas provides a blanket of inert gas between the surfaces so that top hat assembly 10 essentially floats on gland seal 64. In this way, an operator can make the necessary x-y directional adjustments to downfeed handle 28 required to properly position the blank (not shown) during fiber draw. The blanket of inert gas permits top hat assembly 10 to move laterally across gland seal 64 as downfeed handle 28 is moved. Moveover, the inert gas delivered between bottom plate 40 and gland seal 64 provides an entry barrier to ambient air residing above the top of the draw furnace 60. Accordingly, the delivery of inert gas 54 into chamber 50 can be terminated once the bottom door assembly is opened, and fiber is being drawn from the blank.

Once drawing operations are complete, the bottom door assembly (not shown) is closed, and downfeed handle 28 and any remaining fiber blank (not shown) can be safely removed from draw furnace 60 by raising downfeed handle 28 out of draw furnace 60. In the preferred embodiment of the method of the present invention, inert gas 54 is again delivered into chamber 50 of top hat assembly 10 once the bottom door assembly (not shown) is closed. Downfeed handle 28 is preferably mechanically, hydraulically, or pneumatically withdrawn from draw furnace 60 in the direction of reference arrow B (FIG. 4). As downfeed handle 28 proceeds vertically, lip 66 of blank support portion 30 eventually engages bumper 42. As downfeed handle 28 is elevated further, top hat assembly 10 again rides blank support portion 30, and is removed from the top of draw furnace 60. Inert gas 54 is preferably continuously delivered to chamber 50 throughout the duration of the withdrawal operation. Inert gas 54, preferably argon, directs the hot air rising from the hot zone (not shown) of draw furnace 60 away from gasket 56 and cools the downfeed handle 28 as the heated portion of downfeed handle 28 approaches gasket 56. Accordingly, downfeed handle 28 is cooled before it reaches gasket 56, and gasket 56 is itself cooled by inert gas 54, thereby minimizing heat damage to gasket 56 and reducing the frequency of gasket 56 replacement.

It will be apparent to those skilled in the art that various other modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for cooperating with a downfeed handle to seal a top of an optical waveguide draw furnace, said apparatus comprising:

an assembly constructed and arranged to removably cover the top of the draw furnace and mate with the downfeed handle, said assembly comprising an elongated sleeve having a base and defining a chamber for slidably receiving the downfeed handle therein;

the top of the draw furnace being capable of being covered by said assembly; an inert gas supply communicating with said assembly to selectively deliver inert gas into the chamber; and a sealing mechanism supported by the elongated sleeve to mate with the downfeed handle, said sealing mechanism further comprises a circumferential gasket remote from the base, the gasket being positioned with respect to the sleeve such that the gasket conforms to the periphery of the downfeed handle, an oil lip sealing structure disposed to support the gasket, and a spring interposed between said sealing structure and the gasket to bias the gasket against the handle.

2. The apparatus of claim 1 wherein said inert gas supply comprises a gas selected from the group consisting of nitrogen, helium, or argon.

3. The apparatus of claim 1 wherein said inert gas supply comprises argon, and wherein said inert gas supply is adapted to selectively deliver the argon into the chamber between the gasket and the base.

4. The apparatus of claim 1 wherein said assembly further comprises a bottom plate for cooperating with the top of the draw furnace to prevent air from entering the draw furnace.

5. The apparatus of claim 4 wherein said bottom plate attached to said base.

6. The apparatus of claim 1 wherein the draw furnace comprises a muffle and said sleeve sits above the draw furnace.

7. The apparatus of claim 1 further comprising a bumper assembly attached to said base, said bottom assembly comprises a retaining ring, a bottom plate received onto said ring, and a bumper attached to said ring.

8. The apparatus of claim 1 wherein said sleeve further comprises a purge port located above said base.

9. The apparatus of claim 1 wherein said assembly comprises a bumper assembly attached to said base.

10. The apparatus of claim 9 wherein said bumper assembly comprises a bottom plate for cooperating with the top of the draw furnace to inhibit entry of non-selected gases into the draw furnace while permitting movement of said assembly with respect to the draw furnace.

11. An apparatus for cooperating with a downfeed handle to seal a top of an optical waveguide draw furnace, the draw furnace having a muffle, said apparatus comprising:

an assembly constructed and arranged to removably cover the top of the draw furnace and mate with the downfeed handle, said assembly comprising an elongated sleeve having a base and defining a chamber for slidably receiving the downfeed handle therein, said sleeve having purge port located above said base;

the top of the draw furnace being capable of being covered by said assembly;

an inert gas supply communicating with said assembly to selectively deliver inert gas into the chamber; and a sealing mechanism attached to said sleeve, said mechanism comprising a retaining ring having a recess and an oil lip seal structure retained within said recess.

12. The apparatus of claim 11 further comprising a bumper assembly to receive the top of the draw furnace, said bumper assembly attached to said assembly.

13. The apparatus of claim 12 wherein the draw furnace comprises a seal aligned to mate with said bumper assembly.

14. The apparatus of claim 12 wherein said bumper assembly comprises a bottom plate for cooperating with the top of the draw furnace to inhibit entry of non-selected gases into the draw furnace while permitting movement of said assembly with respect to the draw furnace.

15. The apparatus of claim 11 said sealing mechanism further comprising a gasket and a spring interposed between said oil lip seal structure and the gasket to bias the gasket against the handle.

16. The apparatus of claim 11 wherein a sealing mechanism removably attached to said sleeve and said sealing mechanism to mate with the handle.

* * * * *